(12) United States Patent
Burge

(10) Patent No.: US 11,853,967 B2
(45) Date of Patent: Dec. 26, 2023

(54) RENTAL PROPERTY MANAGEMENT TECHNOLOGY

(71) Applicant: Alarm.com Incorporated, Tysons, VA (US)

(72) Inventor: Gregory Le Burge, Bend, OR (US)

(73) Assignee: Alarm.com Incorporated, Tysons, VA (US)

( * ) Notice: Subject to any disclaimer, the term of this patent is extended or adjusted under 35 U.S.C. 154(b) by 227 days.

(21) Appl. No.: 17/384,081

(22) Filed: Jul. 23, 2021

(65) Prior Publication Data

US 2021/0350324 A1 Nov. 11, 2021

Related U.S. Application Data

(63) Continuation of application No. 14/621,160, filed on Feb. 12, 2015, now Pat. No. 11,100,465.
(Continued)

(51) Int. Cl.
*G06Q 50/16* (2012.01)
*G06Q 30/0645* (2023.01)
(Continued)

(52) U.S. Cl.
CPC ......... *G06Q 10/10* (2013.01); *G05D 23/1917* (2013.01); *G05F 1/66* (2013.01);
(Continued)

(58) Field of Classification Search
CPC .......................... G06Q 50/163; G06Q 30/0645
(Continued)

(56) References Cited

U.S. PATENT DOCUMENTS 6,161,005 A * 12/2000 Pinzon .................. G08C 17/02
455/352
6,536,675 B1 * 3/2003 Pesko ...................... H04K 3/41
165/238
(Continued)

FOREIGN PATENT DOCUMENTS

CA           2633121 A1 *  9/2008
WO       WO2014132108      9/2014

OTHER PUBLICATIONS

V. L. Erickson, M. Á. Carreira-Perpiñán and A. E. Cerpa, "Observe: Occupancy-based system for efficient reduction of HVAC energy," Proceedings of the 10th ACM/IEEE International Conference on Information Processing in Sensor Networks, Chicago, IL, USA, 2011, pp. 258-269. (Year: 2011).*

(Continued)

*Primary Examiner* — Jeff Zimmerman
*Assistant Examiner* — Hunter A Molnar
(74) *Attorney, Agent, or Firm* — Fish & Richardson P.C.

(57) ABSTRACT

Rental property management technology, in which electronic entry data for rental properties, energy related data for the rental properties, reservation data for the rental properties, and settings for energy management of the rental properties is accessed. Integrated data that includes the accessed electronic entry data, the accessed energy related data, and the accessed reservation data integrated with the accessed settings for energy management of the rental properties is stored in electronic storage. The integrated data is analyzed to determine whether energy management of the rental properties aligns with the accessed settings and accords with one or more efficiency rules. Based on the analysis, an energy management operation is performed for at least one of the rental properties.

19 Claims, 8 Drawing Sheets

Related U.S. Application Data

(60) Provisional application No. 61/939,053, filed on Feb. 12, 2014.

(51) Int. Cl.

| | | |
|---|---|---|
| *G06Q 10/02* | (2012.01) | |
| *G06Q 10/10* | (2023.01) | |
| *G05D 23/19* | (2006.01) | |
| *G05F 1/66* | (2006.01) | |
| *G06Q 50/06* | (2012.01) | |

(52) U.S. Cl.
CPC ......... *G06Q 10/02* (2013.01); *G06Q 30/0645* (2013.01); *G06Q 50/06* (2013.01); *G06Q 50/163* (2013.01)

(58) Field of Classification Search
USPC ............................................................ 705/5
See application file for complete search history.

(56) References Cited

U.S. PATENT DOCUMENTS

| | | | |
|---|---|---|---|
| 2003/0149576 A1 | 8/2003 | Sunyich | |
| 2004/0133476 A1 | 7/2004 | Kim | |
| 2005/0103874 A1 | 5/2005 | Erdman, Jr. | |
| 2008/0319807 A1* | 12/2008 | Weiss | G06Q 10/02 |
| | | | 705/5 |
| 2010/0308120 A1* | 12/2010 | Drew | F24F 11/30 |
| | | | 236/46 R |
| 2010/0324962 A1 | 12/2010 | Nesler et al. | |
| 2011/0178937 A1 | 7/2011 | Bowman | |
| 2011/0187493 A1 | 8/2011 | Elfstrom et al. | |
| 2011/0313964 A1 | 12/2011 | Sanchey Loureda et al. | |
| 2012/0035776 A1 | 2/2012 | Zaragoza et al. | |
| 2012/0083305 A1 | 4/2012 | Alexander et al. | |
| 2012/0318490 A1 | 12/2012 | Kopp | |
| 2013/0013122 A1* | 1/2013 | Dyess | F24F 11/64 |
| | | | 700/295 |
| 2013/0024222 A1* | 1/2013 | Dunn | G07C 9/00904 |
| | | | 705/5 |
| 2013/0088320 A1* | 4/2013 | Black | G06Q 10/06 |
| | | | 340/286.08 |
| 2013/0173064 A1 | 7/2013 | Fadell et al. | |
| 2013/0226627 A1* | 8/2013 | Kubovcik | G06Q 10/02 |
| | | | 705/5 |
| 2014/0058567 A1 | 2/2014 | Matsuoka et al. | |
| 2014/0156102 A1 | 6/2014 | Elbaz et al. | |
| 2016/0005015 A1 | 1/2016 | Curtis | |
| 2016/0234186 A1 | 8/2016 | Leblond et al. | |

OTHER PUBLICATIONS

Sookoor et al., "Roomzoner: Occupancy-based Room-Level Zoning of a Centralized HVAC System," 2013 ACM/IEEE International Conference on Cyber-Physical Systems (ICCPS), 2013, pp. 209-218.

* cited by examiner though in the art will recognize that the invention may be used

RENTAL PROPERTY MANAGEMENT TECHNOLOGY

CROSS REFERENCE TO RELATED APPLICATIONS

This application is a continuation of U.S. application Ser. No. 14/621,160, filed Feb. 12, 2015, now allowed, which claims the benefit of U.S. Provisional Application No. 61/939,053, filed Feb. 12, 2014. Both of these prior applications are incorporated by reference in their entirety.

TECHNICAL FIELD

This disclosure relates to rental property management technology.

BACKGROUND

Vacation rental management companies provide owners of second homes with property management and marketing services that generate rental revenue and profits. A vacation rental management company may manage hundreds of properties that may be located relatively close (e.g., within a quarter mile) to the offices of the vacation rental management company or located relatively far from the offices of the vacation rental management company (e.g., remote properties up to fifty miles from the company's base of operation). A vacation rental management company may attempt to limit energy usage at managed properties by asking users (e.g., renters, cleaning staff, etc.) to manually adjust heating/air conditioning temperatures during periods in which the rental property is unoccupied. Additionally, in properties that have heated swimming pools, the vacation rental management company may hire trained individuals to manually turn off the pool heaters during periods in which the rental property is unoccupied.

SUMMARY

Techniques are described for rental property management.

Implementations of the described techniques may include hardware, a method or process implemented at least partially in hardware, or a computer-readable storage medium encoded with executable instructions that, when executed by a processor, perform operations.

The details of one or more implementations are set forth in the accompanying drawings and the description below. Other features will be apparent from the description and drawings.

DETAILED DESCRIPTION

Techniques are described for managing energy usage of rental properties (e.g., vacation rental properties). A system uses guest reservation data to automatically control energy consumption at vacation rental properties, including adjusting a thermostat and a pool heater in accordance with guest reservations and check-ins/check-outs.

Figure 1:
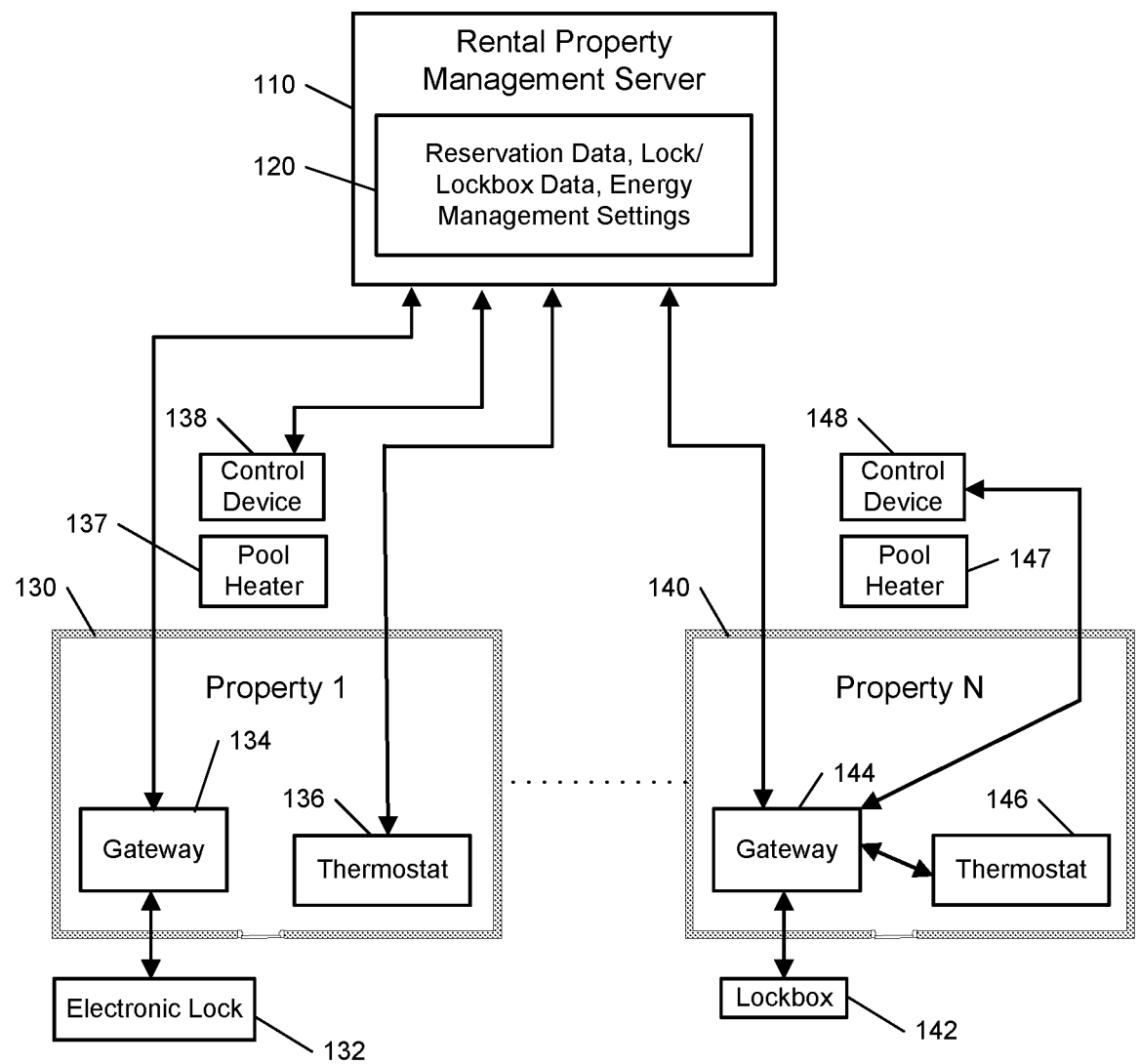
FIG. 1 is a schematic view of an example of a rental property management system.

FIG. 1 illustrates an example rental property management system 100. The system 100 includes a rental property management server 110 that manages rental reservations, electronic locks and/or electronic lockboxes, and energy consuming devices for multiple, different rental properties (e.g., the property 130 and the property 140). The multiple, different properties may be operated by different entities (e.g., owned by different entities) with single entities operating groups of properties. The server 110 may maintain data that defines which entities are associated with which properties (or the electronic locks and/or electronic lockboxes at the properties) and maintain permission data that sets which users are allowed to view data and perform control operations for electronic locks, electronic lockboxes, and energy consuming devices managed by the server 110. Although FIG. 1 illustrates two properties for brevity, the server 110 may manage electronic locks, electronic lockboxes, and energy consuming devices for many more properties and/or structures.

The system 100 also includes electronic lock/lockbox and energy consuming device control components located at each of the properties. As shown, the property 130 includes an electronic lock 132 located at an exterior door of the property 130, a gateway 134 located within the property 130, a thermostat 136 located within the property 130, a pool heater 137 located outside of the property 130, and a control device 138 for the pool heater 137 located outside of the property 130. The electronic lock 132 may include a user input device that receives user input of a passcode and a mechanical lock that unlocks and locks a physical door of an entrance to the property 130. The electronic lock 132 also may include a communication module that performs two-way communication over a short-range wireless communication protocol and a processor that controls the lock to allow access to the property based on entry of a proper passcode through the user input device.

The electronic lock 132 engages in two-way communications with the gateway 134 over the short-range wireless communication protocol. In this example, the gateway 134 includes communication components that allow the gateway 134 to perform two-way communication with the lock 132 over the short-range wireless communication protocol and to perform two-way communication with the server 110 over a long-range communication protocol (e.g., a long-range wired or wireless communication protocol). The gateway 134 may serve as an intermediary between the server 110 and the lock 132 to enable the server 110 to remotely program and manage the lock 132 and also to receive reports when events (e.g., entry of a correct passcode, entry of an incorrect passcode, entry of a check-in or checkout code, etc.) occur at the lock 132.

In some examples, the gateway 134 performs relatively few processing operations and serves to primarily exchange communications between the lock 132 and the server 110. In these examples, the lock 132 includes an electronic storage device that stores passcodes that are valid to open the lock 132 and the processor of the lock 132 performs the decision making processing to determine whether or not a proper passcode has been entered. When the server 110 remotely manages passcodes (e.g., adds passcodes, deletes passcodes, changes passcodes, etc.) for the lock 132, the gateway 134 relays commands from the server 110 to the lock 132 and the processor of the lock 132 interprets the commands and performs adjustments to the electronic storage device needed to modify the valid passcodes as instructed. For reporting lock events, the lock 132 sends reports of events to the gateway 134 and the gateway 134 relays the reports to the server 110. The server 110 stores the reports and may perform reporting operations for the entity operating the property 130 such that the entity (e.g., owner) may be alerted to events at the lock 132 and may view a history of events at the lock 132. The server 110 also may perform energy management operations for the property 130 based on reports from the lock 132.

In other examples, the lock 132 performs relatively few processing operations and the gateway 134 performs control processing for the lock 132. In these examples, the gateway 134 includes an electronic storage device that stores passcodes that are valid to open the lock 132 and also includes a processor that performs the decision making processing to determine whether or not a proper passcode has been entered. For instance, when a user inputs a passcode at the lock 132, the lock 132 merely forwards the entered passcode to the gateway 134 and the gateway 134 determines whether the passcode is valid. Based on the determination, the gateway 134 sends a command back to the lock 132 to either deny the entered passcode or allow access to the property 130. When the server 110 remotely manages passcodes (e.g., adds passcodes, deletes passcodes, changes passcodes, etc.) for the lock 132, the gateway 134 interprets the commands and performs adjustments to the electronic storage device needed to modify the valid passcodes as instructed. The lock 132 does not need to receive any communication related to the management of passcodes since the gateway 134 stores the valid passcodes. For reporting lock events, the gateway 134 sends reports of events to the server 110. The server 110 stores the reports and may perform reporting operations for the entity operating the property 130 such that the entity (e.g., owner) may be alerted to events at the lock 132 and may view a history of events at the lock 132. The server 110 also may perform energy management operations for the property 130 based on reports from the gateway 134.

In some implementations, the gateway 134 monitors for tampering or malfunction of the lock 132. In these implementations, the gateway 134 detects when communication with the lock 132 has been lost. For instance, the gateway 134 may periodically send pinging communications to the lock 132 and detect that communication has been lost when the lock 132 fails to respond to the pinging communications. When the gateway 134 detects that communication with the lock 132 has been lost, the gateway 134 sends an alert to the server 110 and the server 110 relays the alert as an electronic message (e.g., electronic mail message, text message, etc.) to an entity responsible for servicing the lock 132.

The lock 132 also may perform battery or power management operations. For instance, the lock 132 may operate on battery power and have a component that measures an amount of battery power remaining for the lock 132. The processor of the lock 132 may periodically check the amount of battery power remaining for the lock 132 and compare the current amount of battery power to a threshold. The processor of the lock 132 determines whether the current amount of battery power has fallen below the threshold based on the comparison and, in response to a determination that the current amount of battery power has fallen below the threshold, the processor of the lock 132 controls the communication module of the lock 132 to send a battery alert to the gateway 134. The gateway 134 relays the battery alert to the server 110 and the server 110 relays the battery alert as an electronic message (e.g., electronic mail message, text message, etc.) to an entity responsible for servicing the lock 132.

The property 130 also includes a thermostat 136 located within the property. The thermostat 136 may be associated with an HVAC system of the property 130 and may be configured to monitor temperature and/or energy consumption of the HVAC system. The thermostat 136 further may be configured to dynamically control the operation of the HVAC system. In some instances, the thermostat 136 may receive data identifying one or more operating processes used by the thermostat 136 to control an HVAC system. Additionally or alternatively, the thermostat 136 can send and/or receive information identifying and/or providing information relating to HVAC system components that are connected to terminals of the thermostat 136. In some implementations, the thermostat 136 can, additionally or alternatively, receive data relating to environmental conditions at the property, e.g., at various locations indoors and/or outdoors at the property, can receive data identifying weather forecasts for the geographic region of the property, and/or can receive data relating to activity at the property. The thermostat 136 can directly measure energy consumption of the HVAC system associated with the thermostat 136, or can estimate energy consumption of the HVAC system associated with the thermostat 136. The thermostat 136 includes communication components that allow the thermostat 136 to perform two-way communication with the server 110 over a long-range communication protocol (e.g., a long-range wired or wireless communication protocol). The thermostat 136 may report its status to the server 110 and may receive control communications from the server 110.

The pool heater 137 is a device that heats the water of a swimming pool located at the property 130. The pool heater 137 may be configured to sense the temperature of the water in the swimming pool and heat the water until a desired temperature is reached. The pool heater 137 may be any type of pool heater that consumes energy in heating water of a pool and/or hot tub.

The control device 138 for the pool heater 137 is a device that controls operation of the pool heater 137. The control device 138 may be configured to control the pool heater 137 to turn on and off and/or may be configured to control target temperature set for the pool heater. The control device 138 may monitor the temperature of the water in the swimming pool by receiving measurement data from one or more of a temperature sensor located in the vicinity of the swimming pool, the pool heater 137 (e.g., which senses water temperature, as described above), and other sources of data relating to environmental conditions at the property 130. In some implementations, the control device 138 may be configured to adjust the temperature of swimming pool to a target temperature by turning the pool heater 137 on and off. For instance, the control device 138 may fine-tune the temperature of the swimming pool (e.g., to a target temperature) by controlling the on/off function of the pool heater 137 using pulse width modulated control signals. In some examples, these control signals may be generated based on a measured temperature of the swimming pool. In this regard, the monitored temperature of the swimming pool may be utilized as feedback for the control device 138 in the control of the pool heater 137. For instance, the control device 138 may adjust one or more of the pulse width, amplitude, and frequency of the control signals provided to the pool heater 137 based on the current temperature of the water in the swimming pool. The control device 138 includes communication components that allow the control device 138 to perform two-way communication with the server 110 over a long-range communication protocol (e.g., a long-range wired or wireless communication protocol). The control device 138 may report its status to the server 110 and may receive control communications from the server 110.

In some implementations, the control device 138 controls the pool heater 137 through a pressure sensor safety device of the pool heater 137 that signals the heater 137 to turn off if water pressure drops below an appropriate level. In these implementations, the control device 138 may include a wireless device that is wired "inline" with the pressure sensor of the heater 137. The server 110 may be able to remotely send a "heater off" signal via the Internet to a cellular gateway in the property 130. The "heater off" signal then may be wirelessly sent to the control device 138 that simulates a water pressure drop causing the pool heater pressure sensor to turn off the pool heater 137. A "heater on" signal may return the pressure sensor to a state without the simulated pressure drop, which causes the pool heater 137 to turn on to the extent the pressure in the pool is at an acceptable level.

The property 140 includes an electronic lockbox 142 located at an exterior door of the property 140, a gateway 144 located within the property 140, a thermostat 146 located within the property 140, a pool heater 147 located outside of the property 140, and a control device 148 for the pool heater 147 located outside of the property 140. The electronic lockbox 142 may include a user input device that receives user input of a passcode and a housing that secures a physical key that unlocks and locks a physical door of an entrance to the property 140. The electronic lockbox 142 also may include a communication module that performs two-way communication over a short-range wireless communication protocol and a processor that controls the housing to allow access to the physical key secured within the housing based on entry of a proper passcode through the user input device.

The electronic lockbox 142 engages in two-way communications with the gateway 144 over the short-range wireless communication protocol. In this example, the gateway 144 includes communication components that allow the gateway 144 to perform two-way communication with the lockbox 142 over the short-range wireless communication protocol and to perform two-way communication with the server 110 over a long-range communication protocol (e.g., a long-range wired or wireless communication protocol). The gateway 144 may serve as an intermediary between the server 110 and the lockbox 142 to enable the server 110 to remotely program and manage the lockbox 142 and also to receive reports when events (e.g., entry of a correct passcode, entry of an incorrect passcode, return of a physical key, etc.) occur at the lockbox 142.

In some examples, the gateway 144 performs relatively few processing operations and serves to primarily exchange communications between the lockbox 142 and the server 110. In these examples, the lockbox 142 includes an electronic storage device that stores passcodes that are valid to open the lockbox 142 and the processor of the lockbox 142 performs the decision making processing to determine whether or not a proper passcode has been entered. When the server 110 remotely manages passcodes (e.g., adds passcodes, deletes passcodes, changes passcodes, etc.) for the lockbox 142, the gateway 144 relays commands from the server 110 to the lockbox 142 and the processor of the lockbox 142 interprets the commands and performs adjustments to the electronic storage device needed to modify the valid passcodes as instructed. For reporting lockbox events, the lockbox 142 sends reports of events to the gateway 144 and the gateway 144 relays the reports to the server 110. The server 110 stores the reports and may perform reporting operations for the entity operating the property 140 such that the entity (e.g., owner) may be alerted to events at the lockbox 142 and may view a history of events at the lockbox 142. The server 110 also may perform energy management operations for the property 140 based on reports from the lockbox 142.

In other examples, the lockbox 142 performs relatively few processing operations and the gateway 144 performs control processing for the lockbox 142. In these examples, the gateway 144 includes an electronic storage device that stores passcodes that are valid to open the lockbox 142 and also includes a processor that performs the decision making processing to determine whether or not a proper passcode has been entered. For instance, when a user inputs a passcode at the lockbox 142, the lockbox 142 merely forwards the entered passcode to the gateway 144 and the gateway 144 determines whether the passcode is valid. Based on the determination, the gateway 144 sends a command back to the lockbox 142 to either deny the entered passcode or allow access to the physical key secured in the lockbox 142. When the server 110 remotely manages passcodes (e.g., adds passcodes, deletes passcodes, changes passcodes, etc.) for the lockbox 142, the gateway 144 interprets the commands and performs adjustments to the electronic storage device needed to modify the valid passcodes as instructed. The lockbox 142 does not need to receive any communication related to the management of passcodes since the gateway 144 stores the valid passcodes. For reporting lockbox events, the gateway 144 sends reports of events to the server 110. The server 110 stores the reports and may perform reporting operations for the entity operating the property 140 such that the entity (e.g., owner) may be alerted to events at the lockbox 142 and may view a history of events at the lockbox 142. The server 110 also may perform energy management operations for the property 140 based on reports from the gateway 144.

In some implementations, the gateway 144 monitors for tampering or malfunction of the lockbox 142. In these implementations, the gateway 144 detects when communication with the lockbox 142 has been lost. For instance, the gateway 144 may periodically send pinging communications to the lockbox 142 and detect that communication has been lost when the lockbox 142 fails to respond to the pinging communications. When the gateway 144 detects that communication with the lockbox 142 has been lost, the gateway 144 sends an alert to the server 110 and the server 110 relays the alert as an electronic message (e.g., electronic mail message, text message, etc.) to an entity responsible for servicing the lockbox 142.

The lockbox 142 also may perform battery or power management operations. For instance, the lockbox 142 may operate on battery power and have a component that measures an amount of battery power remaining for the lockbox 142. The processor of the lockbox 142 may periodically check the amount of battery power remaining for the lockbox 142 and compare the current amount of battery power to a threshold. The processor of the lockbox 142 determines whether the current amount of battery power has fallen below the threshold based on the comparison and, in response to a determination that the current amount of battery power has fallen below the threshold, the processor of the lockbox 142 controls the communication module of the lockbox 142 to send a battery alert to the gateway 144. The gateway 144 relays the battery alert to the server 110 and the server 110 relays the battery alert as an electronic message (e.g., electronic mail message, text message, etc.) to an entity responsible for servicing the lockbox 142.

The gateway 144, the thermostat 146, the pool heater 147, and the control device 148 are similar to the gateway 134, the thermostat 136, the pool heater 137, and the control device 138 and may perform operations similar those described above as being performed by the gateway 134, the thermostat 136, the pool heater 137, and the control device 138. The difference shown for the property 140 as compared to the property 130 is the communication with the server 110. As shown, unlike the thermostat 136 and the control device 138, the thermostat 146 and the control device 148 do not communicate with the server 110 over a long-range communication protocol. Rather, the thermostat 146 and the control device 148 communicate with the gateway 144 over a short-range communication protocol (e.g., a wired or wireless short-range communication protocol) and the gateway 144 relays communications between the thermostat 146 and the control device 148 and the server 110.

In some examples, a gateway may not be used. In these examples, the locks and/or lockboxes may communicate directly with the server 110 over a long-range communication protocol.

In some implementations, the server 110 receives data related to access of the lock 132 (e.g., timing of accesses as well as the codes used for access), receives data related to access of the lockbox 142 (e.g., timing of accesses as well as the codes used for access), receives data related to the thermostat 136 (e.g., temperature settings and energy consumption data), receives data related to the thermostat 146 (e.g., temperature settings and energy consumption data), receives data related to the pool heater 137 (e.g., temperature settings and energy consumption data), and receives data related to the pool heater 147 (e.g., temperature settings and energy consumption data). In these implementations, the server 110 also receives data related to reservations for the rental properties managed by the server 110. The server 110 may provide a web interface that enables users (e.g., travel agents, travelers, property management personnel, etc.) to manage reservations for the rental properties (e.g., make reservations, cancel reservations, change reservations, etc.). In these implementations, the server 110 further receives data related to settings for energy management provided by owners of the rental properties managed by the server 110. The server 110 may provide a web interface that enables each owner to define energy management settings for their rental properties (e.g., rules related to energy control, energy management profiles for rented and unrented states of the property, etc.). The server 110 maintains a database 120 that stores integrated reservation data and property usage data (e.g., lock/lockbox usage data, thermostat usage data, and pool heater usage data) with energy management settings. The server 110 may analyze the integrated reservation data and property usage data stored in the database 120 to provide alerts/reports based on both reservation data and property usage data and also to verify that energy usage at the property 130 and at the property 140 is being properly managed. The server 110 also enables owners of the properties to edit energy management settings and have energy usage managed at the properties in an automated manner that accounts for the reservation data and the property usage data stored in the database 120.

The energy management operations performed by the server 110 may reduce energy consumption and limit labor and travel expenses by automating the process of adjusting and controlling energy consuming devices in remotely located rental properties during periods of un-occupancy. For example, the server 110 may perform wireless HVAC control in a manner tied to guest reservation data. In this example, the server 110 stores reservation information (e.g., periods in which properties are rented, arrival date-time, departure date-time, etc.) for each property being managed by the server 110. At a particular number of hours prior to the guest arrival, the server 110 may send a signal via the Internet to the cellular gateway in the rental property. The signal may include a guest arrival temperature setting and the cellular gateway may then send the guest arrival temperature setting to the wireless thermostat located in the rental property, which the thermostat uses to set the target temperature.

The particular number of hours prior to the guest arrival at which arrival preparation begins and the guest arrival temperature setting may be set by the owner of the property or the rental management company that operates the server 110. The rental management company may define limits in which the owner of the property can choose the desired number of hours and the guest arrival temperature setting to prevent owners from choosing unreasonable settings that are likely to result in guest dissatisfaction.

The guest also may set the particular number of hours prior to the guest arrival at which arrival preparation begins and the guest arrival temperature setting. The owner of the property and/or the rental management company may define limits in which the guest can choose the desired number of hours and the guest arrival temperature setting to prevent guests from choosing unreasonable settings that are likely to result in wasted energy consumption.

In controlling energy management, the server 110 may consider reservation data for the rental property and/or events detected by a lock or lockbox at the rental property. For instance, the server 110 may define the guest arrival time used in determining when to begin arrival preparation as the earliest possible check-in time allowed with the reservation or the time when the guest reaches the rental property and enters a check-in code to the electronic lock at the property. In some implementations, the system 110 tracks actual check-in times detected by the lock at the property over time (e.g., many rental periods) and determines an estimated arrival time based on the tracked check-in times. In these implementations, the server 110 may compute an average or median actual check-in time at the rental property based on the tracked check-in times and use the computed average or median actual check-in time as the estimated arrival time.

In addition, the server 110 may use a combination of the reservation data and the electronic lock data in managing energy usage at the rental property. For example, the server 110 may begin arrival preparation based on the earliest possible check-in time allowed with the reservation and then monitor for an event from the electronic lock that signifies that the guest has arrived at the property. In this example, the server 110 may maintain energy management settings for an occupied rental property based on the server 110 detecting the event from the electronic lock that signifies that the guest has arrived at the property within a threshold period of time after the earliest possible check-in time allowed with the reservation. However, based on the server 110 determining that the event from the electronic lock that signifies that the guest has arrived at the property has not been detected within the threshold period of time, the server 110 may initiate energy conservation operations (e.g., at least temporarily stopping heating or cooling of the rental property) and continue monitoring for the event from the electronic lock that signifies that the guest has arrived at the property. The server 110 also may take action to attempt to determine when the guest expects to arrive at the rental property (e.g., sending the guest an electronic message that asks the guest to provide an estimated arrival time).

In some implementations, the server 110 also sets a "departure" temperature. In these implementations, the server 110 may use the guest reservation data (e.g., check out date/time) and may send a signal to the cellular gateway that includes a "departure temperature." The cellular gateway at the property then may send the departure temperature setting wirelessly to the wireless thermostat located in the rental property. The departure temperature and timing of when the departure temperature is used may be set by the rental management company and/or the owner of the rental property in a manner similar to that described above for the arrival temperature. Further, the server 110 may use reservation data and/or electronic lock events to control departure timing similar to how the server 110 uses reservation data and/or electronic lock events to control arrival timing. For instance, the server 110 may monitor for a departure code that the guest is asked to enter at the lock when checking out. The departure code does not operate the electronic lock, but is used to report the check-out to the server 110, which in turn is able to perform energy management operations defined for when the rental property is not occupied by a guest. To the extent the server 110 does not detect the departure code by the latest check-out time allowed with the reservation, the server 110 may, at that time, initiate energy management operations defined for when the rental property is not occupied by a guest.

In addition, the server 110 may perform energy management for the rental property by controlling the pool heater at the rental property using techniques similar to those used by the server 110 in performing energy management using the thermostat (e.g., setting a target temperature for the pool heater and/or turning on and off the pool heater). For instance, the server 110 may use guest reservation information (e.g., arrival date-time/departure date-time) and/or electronic lock event data to turn on the heater a particular number of hours in advance of a guest's arrival and to turn off the heater upon guest departure. The particular number of hours and/or the heater temperature setting may be set by the owner, the rental management company, and/or the guest using techniques similar to those described above for establishing energy management settings for the thermostat. By controlling energy usage of the pool heater remotely, the server 110 may reduce the need to send employees to remote rental properties to turn off/on pool heaters, which may reduce labor costs, travel expenses, and unnecessary energy expenses that result from human error in failing to turn pool heaters on/off during periods of the property being unoccupied.

In some examples, the electronic locks described throughout this disclosure may have firmware and processing capabilities that allow the server 110 to add, delete, and change codes stored at the electronic locks. In these examples, the server 110 may maintain codes that open the electronic lock by categories of users. For instance, the server 110 may set different codes for guests, cleaners, and maintenance workers, detect who is accessing the rental property based on the code used, and control energy management based on the code used (e.g., start a rented energy management profile when a guest code is used to open the electronic lock, but maintain an unrented energy management profile when a cleaner code is used to open the electronic lock).

In addition, the server 110 may set completion codes at the electronic lock to signify completion of a task or event. The completion codes may not operate the lock and may simply be used to notify the server 110 of the completion of the task or event. For example, the completion codes may include a guest check-out code, a cleaning crew finished code, and a maintenance crew finished code. In this example, the server 110 may detect completion of a particular task or event based on the completion code used.

In some implementations, the server 110 tracks, over time, access codes used to gain access to rental properties as well as completions codes used to signify completion of tasks or events at the rental properties. In these implementations, the server 110 may perform analytics on the tracked codes, determine information on how the rental property has been used in the past, and perform energy management and other management operations based on the determined information. The server 110 may determine information on how the property has been used in general and how the property has been used by specific users or categories of users. For example, the server 110 may use cleaner access codes and cleaner completion codes to track when a cleaner starts and stops and determine how long and how often each rental property is cleaned. In this example, the server 110 may suggest how many cleaners the rental management company needs based on average checkout time and average time to clean for all of the rental properties managed by the rental management company. In another example, the server 110 may determine that a repeat guest has consistently checked in at a rental property three hours late and checked-out of the rental property at least four hours early. In this example, the server 110 may determine to set the expected arrival time as three hours late for arrival preparation purposes, set the expected departure time as four hours early for departure energy saving purposes, and schedule a cleaning crew to arrive at the rental property one hour prior to required check-out time to maximize the use of the cleaning crew given that the guest is expected to have checked-out at that time. The server 110 also may track access and completion codes of maintenance workers, correlate the tracked codes with the maintenance tasks performed, and gain information on how long particular maintenance tasks typically take to perform. The server 110 may track any of the information described throughout this disclosure as being available to the server 110 and perform any types of analytics that may be useful in performing future management of the rental properties.

Figure 2:
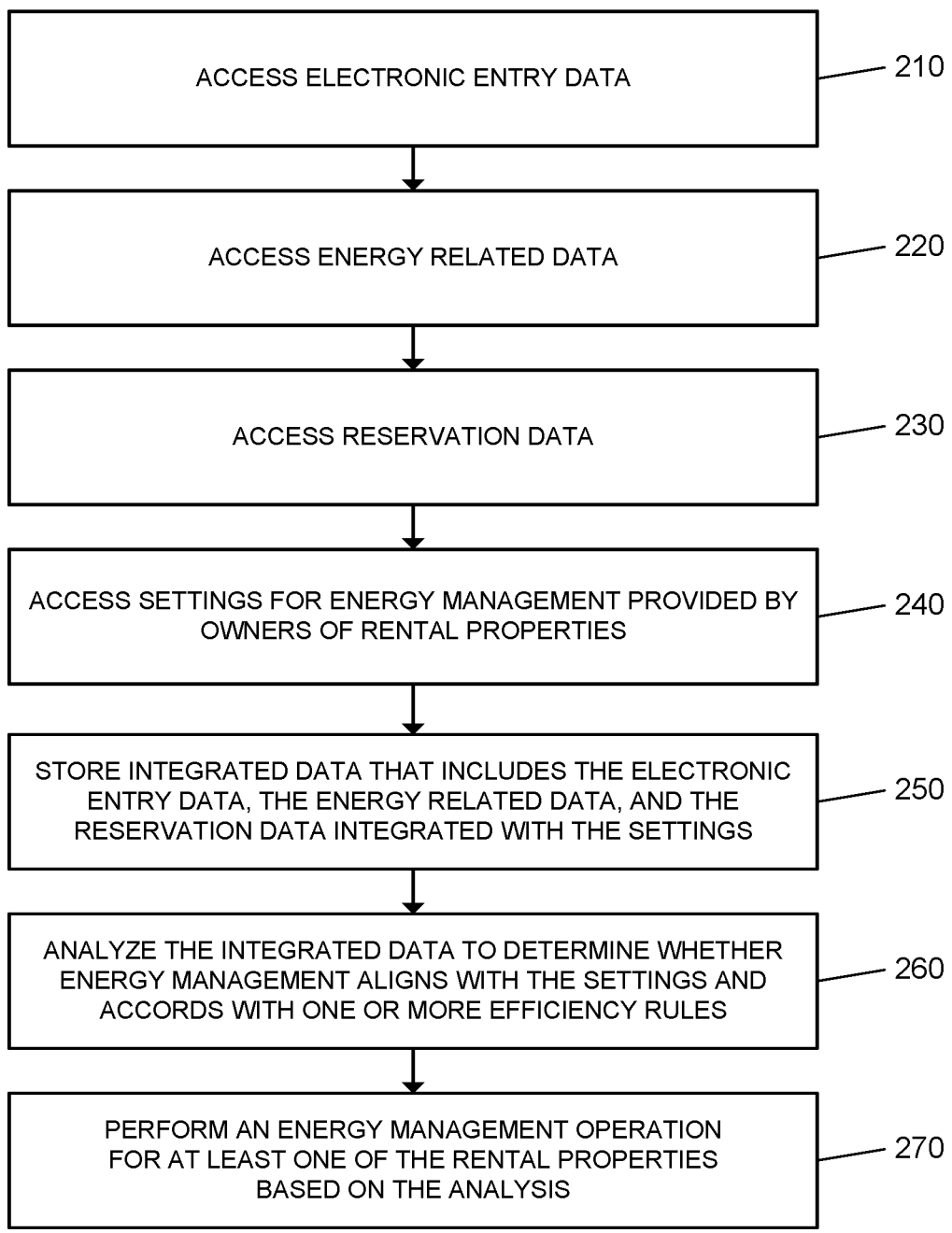
FIGS. 2, 4, 6, and 8 are flow charts of example processes.

FIG. 2 illustrates an example process 200 for managing energy for rental properties. The operations of process 200 are generally described as being performed by system 100. In some implementations, operations of the process 200 may be performed by one or more processors included in one or more electronic devices.

The system 100 accesses electronic entry data (210). For instance, the server 110 may access data generated in association with access of electronic lock 132 and/or a lockbox 142. The entry data may indicate historical entry events associated with one or more rental properties, such as timing of entry into and/or exit from the rental properties, entry of a correct passcode, entry of an incorrect passcode, passcodes used for entry into and/or exit from the rental properties, entry of a check-in or checkout code, and return of a physical key.

The system 100 accesses energy-related data (220). For instance, the server 110 may access data provided by thermostat 136, thermostat 146, pool heater 137, and/or pool heater 147. The energy data may include at least one of temperature settings, temperature conditions, directly-measured energy consumption, or estimated energy consumption.

The system 100 accesses reservation data (230). For instance, the server 110 may access data related to reservations for the managed rental properties. Reservation data may include arrival date-time, departure date-time, and periods in which properties are rented. Reservation data may be received by a web interface provided by server 110 based on user input provided by renters and/or owners through the web interface.

The system 100 also accesses settings for energy management provided by owners of rental properties (240). For instance, the server 110 may access rules related to energy control and energy management profiles for rented and unrented states of rental properties. These settings may be defined by property owners through a web interface as described above.

Further, the system 100 stores integrated data (250) that includes the electronic entry data (e.g., accessed at 210), the energy-related data (e.g., accessed at 220), and the reservation data (e.g., accessed at 230) integrated with the settings (e.g., accessed at 240). For instance, the server 110 may maintain the integrated data in the database 120.

After storing the integrated data, the system 100 analyzes the integrated data to determine whether energy management aligns with the settings and accords with one or more efficiency rules (260). For example, the system 100 evaluates whether the temperature settings for thermostats and/or pool heaters meet the settings established by the owners of the rental properties based on current occupancy states of the rental properties. In this example, the system 100 may determine the temperature settings for thermostats and/or pool heaters at the rental properties, determine occupancy states for the rental properties based on entry and reservation data (e.g., rented and occupied, rented and unoccupied, unrented and occupied, and unrented and unoccupied), compare the determined temperature settings with the settings established by owners for the determined occupancy states, and, based on comparison results, determine whether the determined temperature settings meet the owner settings. The system 100 may identify rental properties that align with the owner settings, rental properties that contrast with the owner settings in a manner that consumes more energy than desired by the owners (e.g., the thermostat setting is lower or higher than needed), and rental properties that contrast with the owner settings in a manner that leaves the property in a condition less preferred for occupancy (e.g., the thermostat setting is not as low or high as desired for preferred occupancy).

The system 100 also takes into account one or more efficiency rules in analyzing the integrated data. The one or more efficiency rules may be defined by the rental property management company to assist owners in managing rental properties in an energy efficient manner. The one or more efficiency rules may relate to temperature settings of thermostats and/or pool heaters for different occupancy states of the rental properties. The one or more efficiency rules also may relate to actual energy consumption at the rental properties. The rental property management company may define the efficiency rules based on industry standards on the minimal conditions needed to maintain rental properties and the energy needed to meet the minimal conditions. The rental property management company also may define the efficiency rules based on statistical analysis of how energy is used in the network of rental properties managed by the rental property management company. For instance, the efficiency rules may be defined based on average or median temperature settings across the network of rental properties for different occupancy states of the rental properties and/or average or median measured energy consumption across the network of rental properties for different occupancy states of the rental properties. The system 100 may compare energy related data at the rental properties to the efficiency rules to determine whether the rental properties are being maintained in an energy efficient manner.

Based on this analysis, the system 100 may perform an energy management operation for at least one of the rental properties (270). In some implementations, the server 110 may perform energy management operations, such as verifying energy usage at the rental properties, generating reports related to energy usage at the rental properties, providing alerts related to energy usage at the rental properties based on determining that the rental properties do not align with owner settings and/or efficiency rules, providing suggestions based on determining that the rental properties do not align with efficiency rules, and automatically, without user input, adjusting settings of energy consuming devices at the rental properties. For example, the server 110 may determine that a rental property will likely be unoccupied in one hour and, in anticipation of the vacancy and in accordance with one or more efficiency rules, begin to reduce the temperature setting of the thermostat at the rental property.

Figure 3:
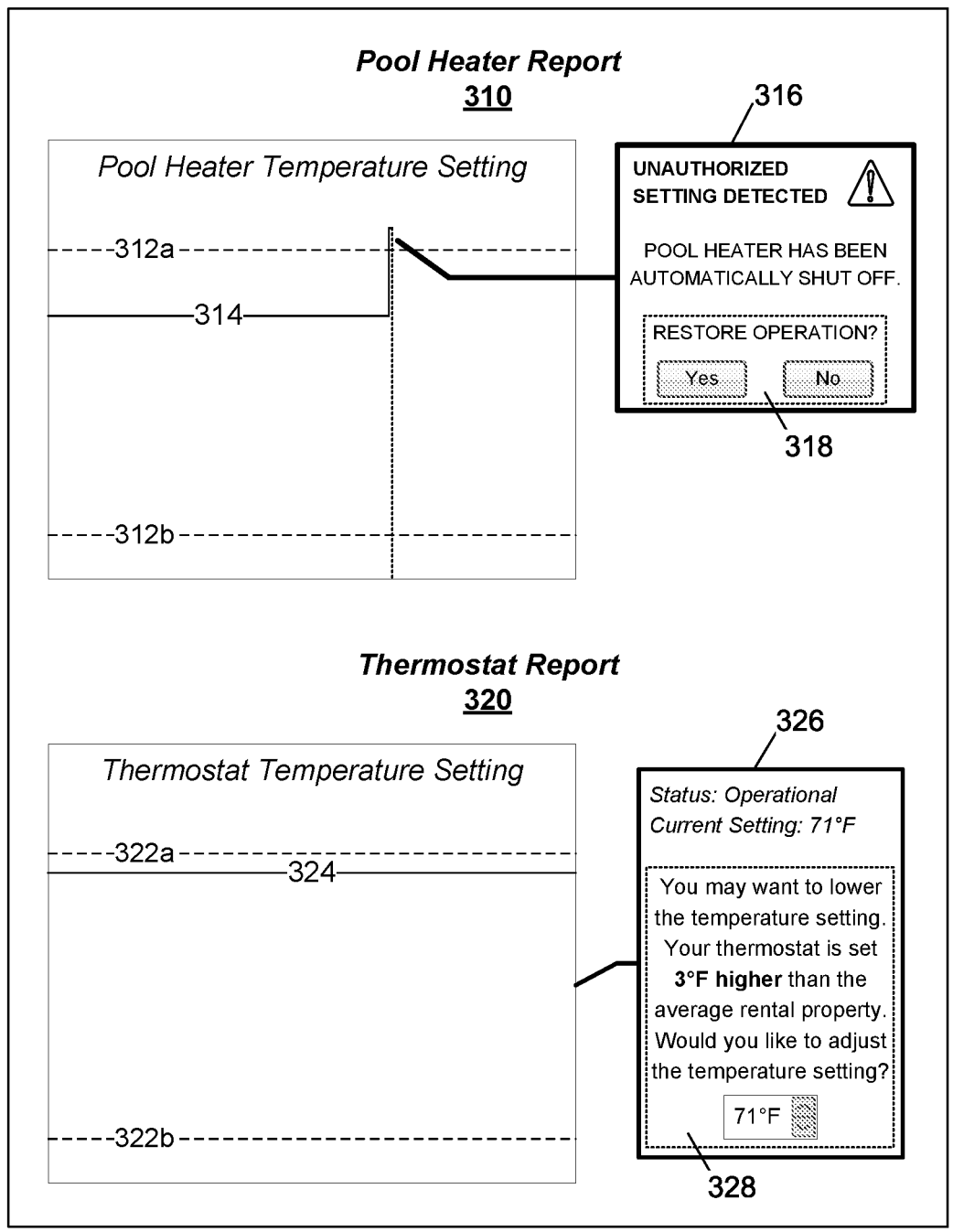
FIG. 3 illustrates an example interface of an example report related to energy management.

FIG. 3 illustrates an exemplary report 300 for communicating energy management statuses to a rental property owner. Report 300 is generally described as being generated by server 110 on the basis of both reservation data and property usage data, as described above in association with FIGS. 1 and 2, to verify that energy usage at the owner's property is being properly managed. For example, report 300 might provide a pool heater report 310 to indicate the status of a pool heater and a thermostat report 320 to indicate the status of a thermostat. In addition to indicating the statuses of the pool heater and thermostat, report 300 may also indicate whether the pool heater and the thermostat have been operating in accordance with the given rules and settings. For example, under proper management the pool heater temperature setting should remain within a range bound by limits 312a and 312b. The pool heater report 310 shows that the energy usage of the pool heater has not been properly managed in that pool heater temperature setting 314 has deviated outside of the range bound by limits 312a and 312b. For example, a guest may have changed a setting (or tampered with) the pool heater to modify the settings defined by the owner. In this case, the pool heater report 310 may include alert 316 indicating that an unauthorized temperature setting of the pool heater has been detected. In some implementations, system 100 may be configured to automatically shut off a pool heater or thermostat in response to detecting rule-violation. In this example, alert 316 may be accompanied with a notice indicating that the pool heater has been shut off. In addition, the property owner may be presented with an operation interface 318 that a property owner may interact with to restore operation of the disabled pool heater (or thermostat).

The thermostat report 320 indicates that energy usage of the thermostat has been properly managed in that its temperature setting 324 has remained within the range bound by limits 322a and 322b. The thermostat report 320 may also include a message 326 to present information, such as operating status and parameters. These reports also may be augmented with other information, such as suggestion 328, which provides an energy-saving tip to the owner. In this example, suggestion 328 presents analytical data regarding energy usage trends in similar rental properties and suggests that it might benefit to lower the temperature setting of the thermostat. Suggestion 328 also may be accompanied by an interface to allow the owner to act on the advice and modify the thermostat temperature setting. In some implementations, report 300 may provide owners with one or more interfaces to edit any desired energy management setting.

Figure 4:
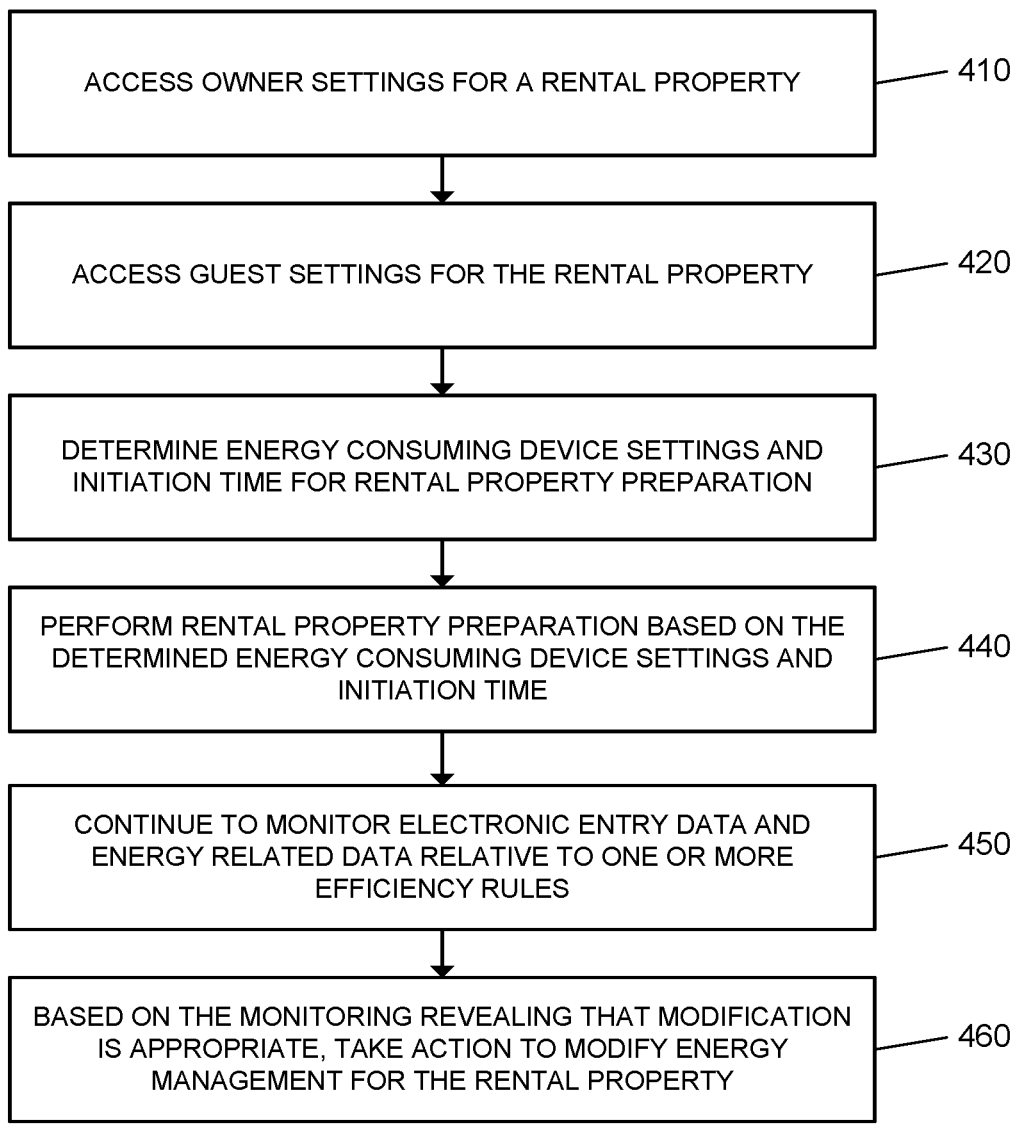

FIG. 4 illustrates an example process 400 for rental property preparation management. The operations of process 400 are generally described as being performed by system 100. In some implementations, operations of the process 400 may be performed by one or more processors included in one or more electronic devices.

As illustrated in FIG. 4, the system 100 accesses owner settings for a rental property (410). For instance, the server 110 may access owner settings that define guest arrival temperature limits and a particular number of hours prior to guest arrival at which point arrival preparation is to begin.

The system 100 also accesses guest settings for the rental property (420). For instance, the server 110 may access guest settings that define temperature settings the guest prefers and an estimated check-in time that the guest expects to arrive at the rental property. The server 110 may, in advance of the guest's stay, access the guest settings through a web interface based on user input provided by a guest that has reserved the rental property.

The system 100 may then determine energy consuming device settings and initiation time for rental property preparation (430) and perform rental property preparation based on the determined energy consuming device settings and initiation time (440). The system 100 may determine energy consuming device settings and initiation time for rental property preparation that meets the desired guest settings as closely as possible while conforming to the owner settings related to energy efficiency.

Figure 5:
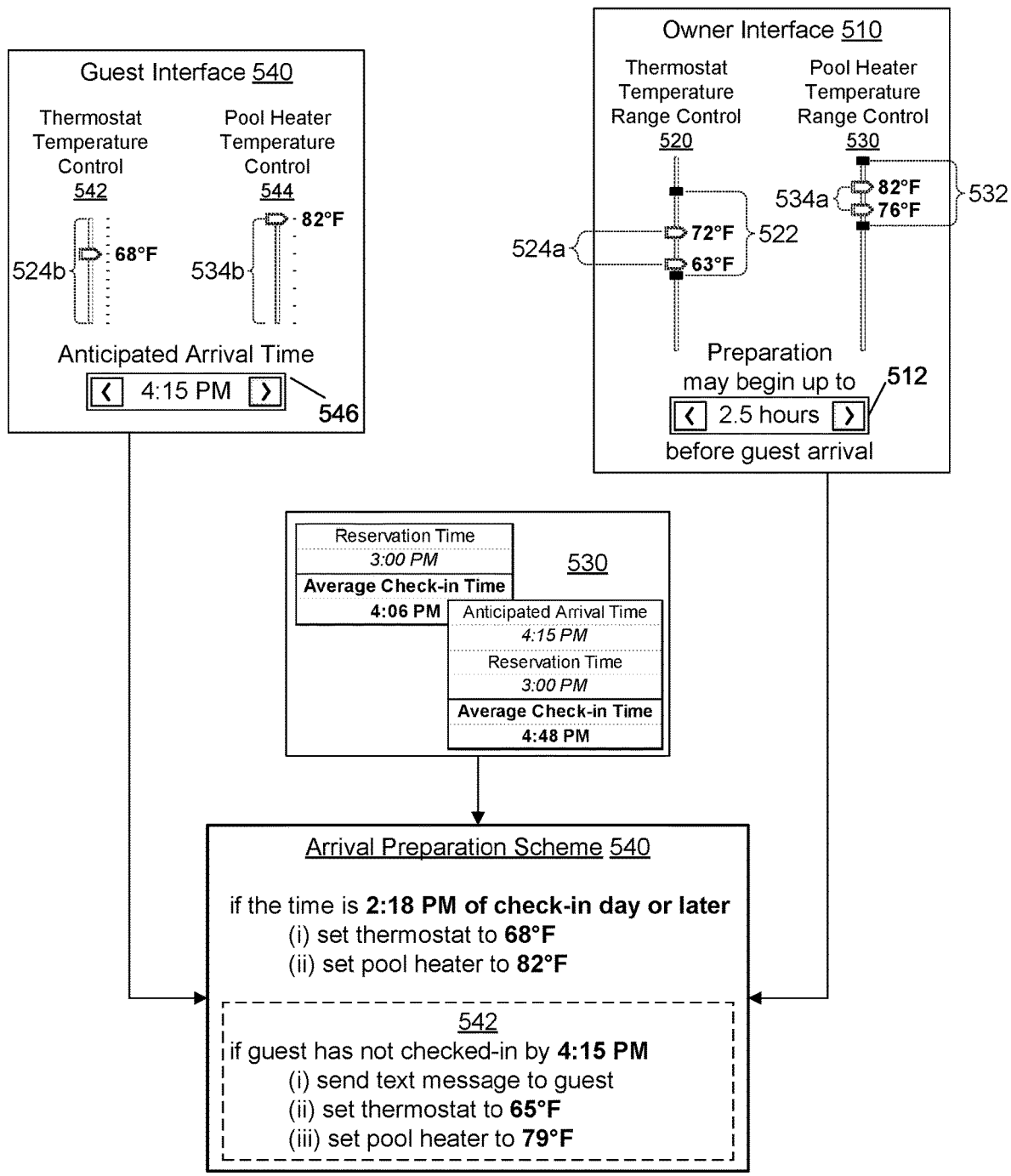
FIGS. 5 and 7 illustrate examples of arrival preparation for a rental property and departure preparation for the rental property, respectively.

FIG. 5 illustrates an exemplary framework 500 for performing rental property preparation management. The framework 500 includes an owner interface 510 provided to an owner of a rental property and a guest interface 540 provided to a guest of the rental property. Based at least on settings defined by owner interface 510, guest interface 540, and analytics data 530, the system determines an arrival preparation scheme 540.

Referring to FIG. 5, the owner settings as described above in association with reference numeral 410 may be defined by a rental property owner through the use of owner interface 510. For example, a rental property owner may interact with a thermostat temperature range control 520 and a pool heater temperature range control 530 to establish guest arrival temperature limits 524*a* and 534*a*, respectively. For example, a rental management company may define a thermostat temperature range 522 in which the owner of the property can choose the thermostat guest arrival temperature setting range 524*a* to prevent owners from choosing unreasonable settings that are likely to result in guest dissatisfaction. Similarly, the rental management company may define pool heater temperature range 532 in which the owner of the property can choose the pool heater guest arrival temperature range 534*a*. The rental property owner also may define the particular number of hours prior to guest arrival at which arrival preparation is to begin using preparation timer 512. The rental property management company may define a limit on how much time the owner must allow for property preparation prior to anticipated guest arrival (e.g., the rental property management company may define that the owner must give at least one hour of preparation). In this regard, the rental company may be able to define limits for the time selected using preparation timer 512.

The guest settings as described above in association with reference numeral 420 may be defined by a rental property guest through the use of guest interface 540. For example, a rental property guest may interact with thermostat temperature control 542 and pool heater control 544 to define the respective temperatures that the guest desires to be welcomed by upon arriving at the rental property. The range of thermostat temperatures 524*b* that the guest is allowed to choose from may be equal to the thermostat guest arrival temperature setting range 524*a*. Similarly, the range of pool heater temperatures 534*b* that the guest is allowed to choose from may be equal to the pool heater guest arrival temperature setting range 534*a*. The guest may modify an anticipated arrival time setting 546 to specify the time at which they expect to arrive at the rental property. The time provided by 546 may be especially helpful in conserving energy in instances where guests may be arriving significantly later than the check-in time associated with their reservation.

The energy device settings and initiation time as described above in association with reference numeral 430 may be included in arrival preparation scheme 540, which may be determined on the basis of information generated by owner interface 510 and guest interface 540. In some implementations, additional analytics data 530 is utilized in determining the arrival preparation scheme 540. For example, analytics data 530 may include data provided by the server 110 upon tracking actual check-in times detected by the lock (or lockbox) at the property over time and determining an estimated arrival time based on the tracked check-in times. In the example of FIG. 5, the preparation initiation time without taking into account the analytics data 530 may be 1:45 PM, which is 2.5 hours (e.g., as defined by 512) before the anticipated arrival time of 4:15 PM (e.g., as defined by 546). With the analytics data 530, the preparation initiation time is adjusted to account for the analytics data 530 indicating that guests with a 3:00 PM reservation time that indicate a 4:15 PM arrival time typically do not arrive at the rental property until 4:48 PM. Accordingly, the preparation initiation time may be adjusted to 2:18 PM, which is 2.5 hours (e.g., as defined by 512) before the estimated arrival time of 4:48 PM determined in the analytics data 530. Other adjustments and computations of initiation time based on the anticipated arrival time setting 546, the analytics data 530, and the time selected using preparation timer 512 are possible.

In addition to the energy device settings (e.g., settings (i)-(ii)) and initiation time (e.g., 2:18 PM), the arrival preparation scheme 540 also may include modification 542, which allows the server 110 to reduce the temperature and send a text message to the guest if they have not arrived to the rental property by the anticipated arrival time. The process described below in association with reference numeral 440 may be performed by server 110 in abiding by the conditions as established in the arrival preparation scheme 540.

Referring again to FIG. 4, the system 100 continues to monitor electronic entry data and energy related data relative to one or more efficiency rules (450) and, based on the monitoring revealing that modification is appropriate, take action to modify energy management for the rental property (460). For instance, as shown in FIG. 5, the system 100 may monitor entry data and determine whether the guest has arrived at the rental property by the anticipated arrival time of 4:15 PM defined in the anticipated arrival time setting 546. If the guest has not arrived, the system 100 may take action to conserve energy by automatically reducing the temperature of the thermostat and pool heater. In addition, the system 100 may take action to update the anticipated arrival time of the guest by, for example, sending a text message to the guest asking for an updated anticipated arrival time. In this regard, the system 100 takes action to conserve energy at the property while still attempting to provide the guest with desired conditions when the guest arrives at the property. Following the performance of arrival preparation, the system 100 may perform operations similar to that which has been described above in association with process 200 to perform energy management in accordance with the state of the rental property.

Figure 6:
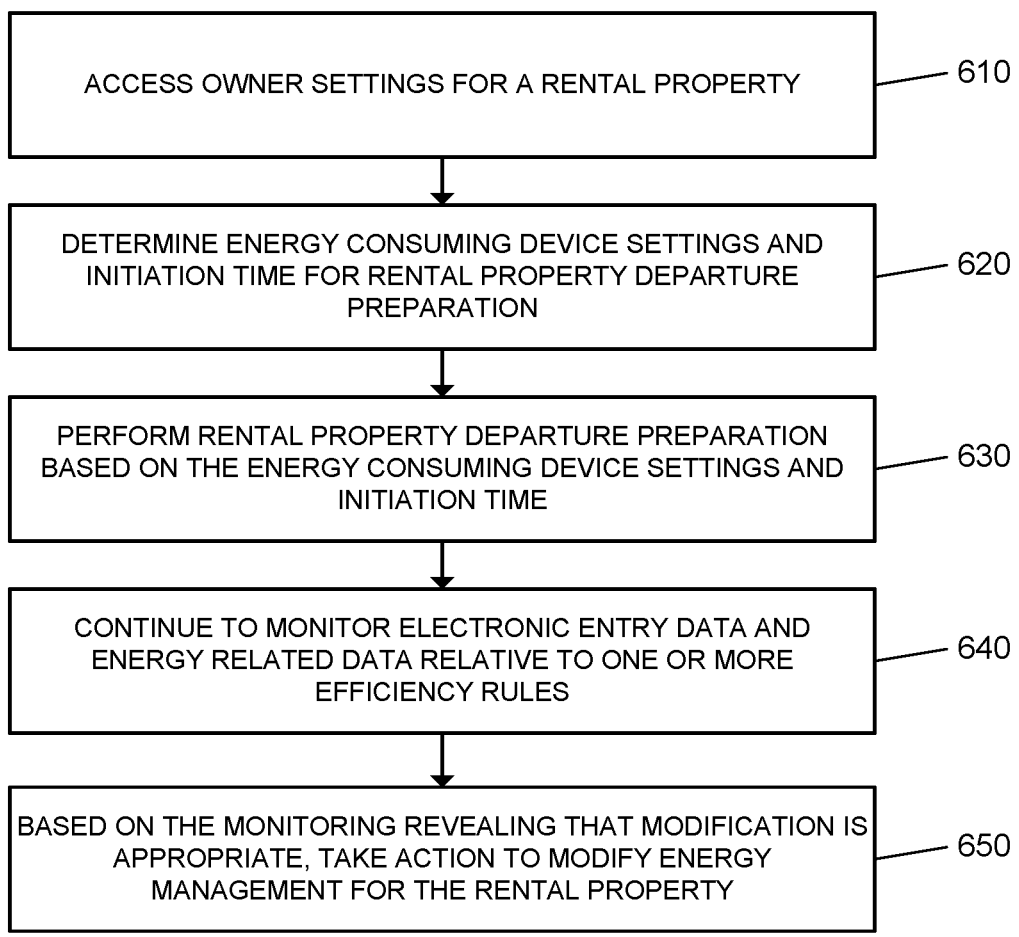

FIG. 6 illustrates an example process 600 for rental property departure management. The operations of process 600 are generally described as being performed by system 100. In some implementations, operations of the process 600 may be performed by one or more processors included in one or more electronic devices.

As illustrated in FIG. 6, the system 100 may access owner settings for a rental property (610), determine energy consuming device settings and initiation time for rental property departure preparation (620), and perform rental property departure preparation based on the energy consuming device settings and initiation time (630). The operations for performing rental property departure in accordance with reference numerals 610-630 are similar to the operations performed in accordance with reference numerals 410, 430, and 440, but modified for the context of departure instead of arrival.

Figure 7:
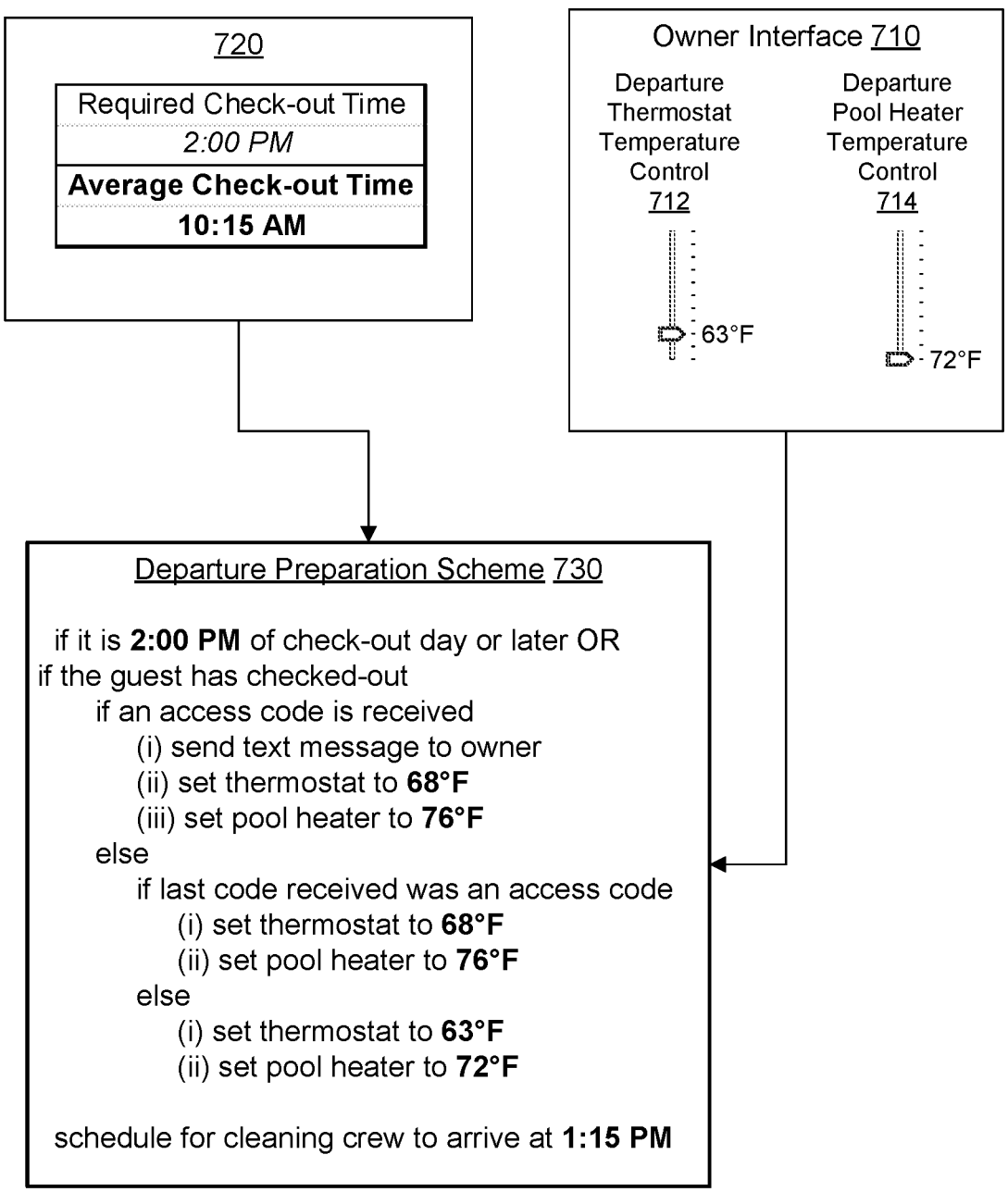

FIG. 7 illustrates an exemplary framework 700 for performing rental property departure management. The framework 700 includes an owner interface 710 provided to an owner of a rental property. Based at least on settings defined by owner interface 710 and analytics data 720 a departure preparation scheme 730 can be determined.

Referring to FIG. 7, the owner settings described above in association with reference numeral 610 may be defined by a rental property owner through the use of owner interface 710. For example, a rental property owner may interact with a departure thermostat control 712 and a departure pool heater control 714 of owner interface 710 to define the respective temperatures that the rental property owner wishes to maintain during periods of vacancy.

In some implementations, analytics data 720 may include data provided by the server 110 upon tracking actual check-out times detected by the lock (or lockbox) at the property over time and determining an estimated departure time based on the tracked check-out times. The estimated departure time may be earlier than the departure time required by the reservation and, thus, enable departure preparation to occur earlier, thereby resulting in energy savings and/or more flexibility in servicing the rental property.

The energy device settings and initiation time as described above in association with reference numeral 620 may be included in departure preparation scheme 730, which may be determined on the basis of information generated by owner interface 710 and analytics data 720. The departure preparation scheme 730 demonstrates the rules that the server 110 follows in the anticipation of an event of rental property vacancy. In the example of FIG. 7, the departure preparation scheme 730 ensures that the temperatures defined by the owner using controls 712 and 714 are met in the event that the check-out time is reached or upon guest departure. Such a guest departure may be determined, for example, based on reception of a check-out passcode as described above. The departure preparation scheme 730 also outlines a routine for elevating temperature settings and sending a text message to the rental property owner upon reception of an access code at the lock. Reception of an access code after check-out may indicate that maintenance or cleaning staff, for example, have entered the rental property. The departure preparation scheme 730 also may include instructions for the automatic scheduling of cleaning services, for example. The process described in association with reference numeral 630 may be performed by server 110 in abiding by the conditions as established in the departure preparation scheme 730.

In some examples, the system 100 accounts for the next anticipated arrival of a guest known from reservation data for the rental property in handling departure preparation. In these examples, the system 100 may determine whether the next guest is to arrive in a relatively short period of time (e.g., later in the day) or in a relatively long period of time (e.g., one month) and adjust departure preparation accordingly. For instance, if the next guest is scheduled to arrive later that same day as departure, the system 100 may take no action or only slightly adjust temperature settings at the rental property. Alternatively, if the next guest is scheduled to arrive one month from departure, the system 100 may significantly adjust temperature settings at the rental property or discontinue thermostat and pool heater operation altogether, until the next guest's arrival approaches.

Referring again to FIG. 6, the system 100 continues to monitor electronic entry data and energy related data relative to one or more efficiency rules (640) and, based on the monitoring revealing that modification is appropriate, take action to modify energy management for the rental property (650). The operations for performing monitoring after rental property departure in accordance with reference numerals 640 and 650 are similar to the operations performed in accordance with reference numerals 450 and 460, but modified for the context of departure instead of arrival. For instance, following the performance of departure preparation, the system 100 may perform operations similar to that which has been described above in association with process 200 to perform energy management in accordance with the state of the rental property.

Figure 8:
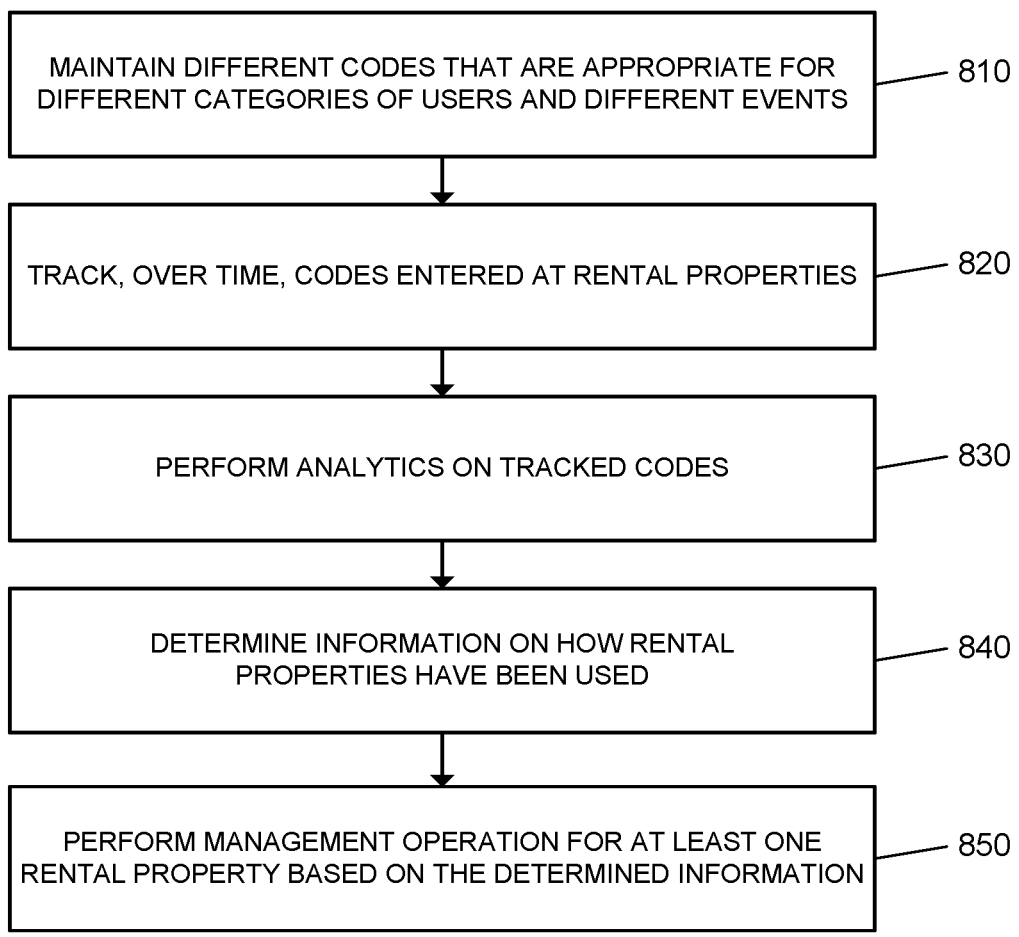

FIG. 8 illustrates an example process 800 for managing rental property operations. The operations of process 800 are generally described as being performed by system 100. In some implementations, operations of the process 800 may be performed by one or more processors included in one or more electronic devices.

The system 100 maintains different codes that are appropriate for different categories of users and different events (810). For instance, the server 110 may add, delete, and change codes stored at electronic locks and/or lockboxes of rental properties. The server 110 may set different codes for guests, cleaners, and maintenance workers, for example, to detect who is accessing the rental property based on the code used. The server 110 may set start codes to signify the start of a task, such as a guest check-in code, a cleaning crew start code, and a maintenance crew start code. The server 110 also may set completion codes to signify the completion of a task, such as a guest check-out code, a cleaning crew finish code, and a maintenance crew finish code. Further, different codes may be used for different tasks, such as cleaning codes, HVAC repair codes, pool heater maintenance codes, washing machine maintenance codes, etc. The system 100 may use the start and completion codes to track how long specific tasks take.

The system 100 may track, over time, codes entered at rental properties (820), perform analytics on the tracked codes (830), and determine information on how rental properties have been used (840). For instance, the server 110 may track the codes described above and determine information relating to how the rental property has been used in the past, how the rental property has been used in general, and determine how the property has been used by specific users or categories of users. For example, the server 110 may determine how long and how often each rental property is cleaned.

The system 100 may perform a management operation for at least one rental property based on the determined information (850). The management operation may relate to energy management using techniques described throughout this disclosure, but also may relate to other types of management operations. For instance, the server 110 may perform a scheduling management operation by scheduling a cleaning crew to arrive at a rental property within a small window of time between reservations to maximize the use of cleaning crew given that the cleaning crew, for example, can statistically clean this particular property in less than 20 minutes. The server 110 may track any of the information described throughout this disclosure as being available to the server 110 and perform any types of analytics that may be useful in performing future management of the rental properties.

Described systems, methods, and techniques may be implemented in digital electronic circuitry, computer hardware, firmware, software, or in combinations of these elements. Apparatus implementing these techniques may include appropriate input and output devices, a computer processor, and a computer program product tangibly embodied in a machine-readable storage device for execution by a programmable processor. A process implementing these techniques may be performed by a programmable processor executing a program of instructions to perform desired functions by operating on input data and generating appropriate output. The techniques may be implemented in one or more computer programs that are executable on a programmable system including at least one programmable processor coupled to receive data and instructions from, and to transmit data and instructions to, a data storage system, at least one input device, and at least one output device. Each computer program may be implemented in a high-level procedural or object-oriented programming language, or in assembly or machine language if desired; and in any case, the language may be a compiled or interpreted language. Suitable processors include, for example, both general and special purpose microprocessors. Generally, a processor will receive instructions and data from a read-only memory and/or a random access memory. Storage devices suitable for tangibly embodying computer program instructions and data include all forms of non-volatile memory, including by way of example semiconductor memory devices, such as Erasable Programmable Read-Only Memory (EPROM), Electrically Erasable Programmable Read-Only Memory (EEPROM), and flash memory devices; magnetic disks such as internal hard disks and removable disks; magneto-optical disks; and Compact Disc Read-Only Memory (CD-ROM). Any of the foregoing may be supplemented by, or incorporated in, specially-designed ASICs (application-specific integrated circuits).

It will be understood that various modifications may be made. For example, other useful implementations could be achieved if steps of the disclosed techniques were performed in a different order and/or if components in the disclosed systems were combined in a different manner and/or replaced or supplemented by other components. Accordingly, other implementations are within the scope of the disclosure.

What is claimed is:

1. A computer-implemented method for managing access to a plurality of properties each including a respective electronic lock, wherein access to a property of the plurality of properties is enabled by operating the respective electronic lock using an electronic lock code, the method comprising:
    accessing, by at least one processor and from a storage device, a stored plurality of electronic lock codes for operating the respective electronic locks of the plurality of properties, wherein each stored electronic lock code corresponds to a different category of users;
    obtaining, by the at least one processor, electronic lock code data indicating electronic lock codes used at each of the plurality of properties over a duration of time;
    determining, by the at least one processor and using (a) the stored plurality of electronic lock codes and (b) the electronic lock code data, average times of arrival and departure of a particular category of users at the plurality of properties over the duration of time;
    classifying, by the at least one processor, a first user as belonging to the particular category of users;
    determining, by the at least one processor and using the average times of arrival and departure of the particular category of users, an estimated time of arrival or an estimated time of departure of the first user at a first property of the plurality of properties; and
    performing a management operation for the first property, including transmitting, from the at least one processor over a wired or wireless network to one or more energy consuming devices at the first property, an instruction that is configured to adjust a setting of the one or more energy consuming devices at a first time, the first time being selected based on the estimated time of arrival or the estimated time of departure of the first user at the first property.

2. The method of claim 1, comprising:
    determining, by the at least one processor and based on the electronic lock code data, a frequency of property visits by the particular category of users at each property of the plurality of properties over the duration of time; and
    performing the management operation for the first property based on the frequency of property visits by the particular category of users.

3. The method of claim 1, wherein the particular category of users includes one of a visitor category, an owner category, a cleaning service provider category, or a maintenance service provider category.

4. The method of claim 1, wherein each stored electronic lock code corresponds to a category of events.

5. The method of claim 4, comprising:
    determining, by the at least one processor and based on the electronic lock code data, an average time duration of a particular category of events at the plurality of properties over the duration of time; and
    performing the management operation for the first property based on the average time duration of the particular category of events.

6. The method of claim 5, wherein the particular category of events comprises one of a visiting event, a cleaning event, an HVAC maintenance event, a pool maintenance event, or an appliance maintenance event.

7. The method of claim 1, wherein the plurality of electronic lock codes include at least one electronic lock code for locking the respective electronic lock and at least one electronic lock code for unlocking the respective electronic lock.

8. The method of claim 1, wherein the electronic lock code data indicates, for each property, a time that each electronic lock code was entered at the property during the duration of time.

9. The method of claim 1, wherein performing the management operation further comprises performing a schedule management operation to schedule an event at the at least one property.

10. The method of claim 1, wherein performing the management operation further comprises:
predicting, based on the electronic lock code data, a start time of an event at the at least one property; and
performing the management operation based on the predicted start time of the event at the at least one property.

11. The method of claim 1, wherein
the adjusted setting causes the one or more energy consuming devices to modify energy consumption in a manner that causes one or more environmental attributes of the first property to trend towards compliance with one or more energy consumption rules, wherein the one or more environmental attributes reach compliance with the one or more energy consumption rules at approximately the estimated time of departure of the first user from the first property.

12. The method of claim 1, wherein the respective electronic lock comprises one of an electronic door lock or an electronic lockbox.

13. A system comprising:
at least one processor; and
at least one computer-readable storage medium coupled to the at least one processor having stored thereon instructions which, when executed by the at least one processor, causes the at least one processor to perform operations for managing access to a plurality of properties each including a respective electronic lock, wherein access to a property of the plurality of properties is enabled by operating the respective electronic lock using an electronic lock code, the operations comprising:
accessing, by the at least one processor and from a storage device, a stored plurality of electronic lock codes for operating the respective electronic locks of the plurality of properties, wherein each stored electronic lock code corresponds to a different category of users;
obtaining, by the at least one processor, electronic lock code data indicating electronic lock codes used at each of the plurality of properties over a duration of time;
determining, by the at least one processor and using (a) the stored plurality of electronic lock codes and (b) the electronic lock code data, average times of arrival and departure of a particular category of users at the plurality of properties over the duration of time;
classifying, by the at least one processor, a first user as belonging to the particular category of users;
determining, by the at least one processor and using the average times of arrival and departure of the particular category of users, an estimated time of arrival or an estimated time of departure of the first user at a first property of the plurality of properties; and
performing a management operation for the first property, including transmitting, from the at least one processor over a wired or wireless network to one or more energy consuming devices at the first property, an instruction that is configured to adjust a setting of the one or more energy consuming devices at a first time, the first time being selected based on the estimated time of arrival or the estimated time of departure of the first user at the first property.

14. At least one non-transitory computer-readable storage medium having stored thereon instructions which, when executed by at least one processor, cause performance of operations for managing access to a plurality of properties each including a respective electronic lock, wherein access to a property of the plurality of properties is enabled by operating the respective electronic lock using an electronic lock code, the operations comprising:
accessing, by the at least one processor and from a storage device, a stored plurality of electronic lock codes for operating the respective electronic locks of the plurality of properties, wherein each stored electronic lock code corresponds to a different category of users;
obtaining, by the at least one processor, electronic lock code data indicating electronic lock codes used at each of the plurality of properties over a duration of time;
determining, by the at least one processor and using (a) the stored plurality of electronic lock codes and (b) the electronic lock code data, average times of arrival and departure of a particular category of users at the plurality of properties over the duration of time;
classifying, by the at least one processor, a first user as belonging to the particular category of users;
determining, by the at least one processor and using the average times of arrival and departure of the particular category of users, an estimated time of arrival or an estimated time of departure of the first user at a first property of the plurality of properties; and
performing a management operation for the first property, including transmitting, from the at least one processor over a wired or wireless network to one or more energy consuming devices at the first property, an instruction that is configured to adjust a setting of the one or more energy consuming devices at a first time, the first time being selected based on the estimated time of arrival or the estimated time of departure of the first user at the first property.

15. The at least one non-transitory computer-readable storage medium of claim 14, the operations comprising:
determining, by the at least one processor and based on the electronic lock code data, a frequency of property visits by the particular category of users at each property of the plurality of properties over the duration of time; and
performing the management operation for the first property based on the frequency of property visits by the particular category of users.

16. The at least one non-transitory computer-readable storage medium of claim 14, wherein the particular category of users includes one of a visitor category, an owner category, a cleaning service provider category, or a maintenance service provider category.

17. The at least one non-transitory computer-readable storage medium of claim 14, wherein each stored electronic lock code corresponds to a category of events.

18. The at least one non-transitory computer-readable storage medium of claim 17, the operations comprising:
determining, based on the electronic lock code data, an average time duration of a particular category of events at the plurality of properties over the duration of time; and performing the management operation based on the average time duration of the particular category of events.

19. The at least one non-transitory computer-readable storage medium of claim 18, wherein the particular category of events comprises one of a visiting event, a cleaning event, an HVAC maintenance event, a pool maintenance event, or an appliance maintenance event.

* * * * *